US010103834B2

United States Patent
Rosenfelder

(10) Patent No.: US 10,103,834 B2
(45) Date of Patent: Oct. 16, 2018

(54) WIRELESS DISTRIBUTION SYSTEMS (WDSS) EMPLOYING AN OPTICAL STAR COMMUNICATIONS ARCHITECTURE BASED ON QUAD SMALL FORM-FACTOR PLUGGABLE (QSFP) COARSE WAVELENGTH DIVISION MULTIPLEXING (CWDM) TRANSCEIVERS

(71) Applicant: Corning Optical Communications Wireless Ltd., Airport (IL)

(72) Inventor: Pinhas Yehuda Rosenfelder, Beit-Shemesh (IL)

(73) Assignee: Corning Optical Communications Wireless Ltd., Hickory, NC (US)

( * ) Notice: Subject to any disclaimer, the term of this patent is extended or adjusted under 35 U.S.C. 154(b) by 0 days.

(21) Appl. No.: 15/716,733

(22) Filed: Sep. 27, 2017

(65) Prior Publication Data

US 2018/0123721 A1    May 3, 2018

Related U.S. Application Data

(60) Provisional application No. 62/416,306, filed on Nov. 2, 2016.

(51) Int. Cl.
*H04B 10/00* (2013.01)
*H04J 14/02* (2006.01)
*H04J 14/00* (2006.01)

(52) U.S. Cl.
CPC ........ *H04J 14/022* (2013.01); *H04J 14/0232* (2013.01)

(58) Field of Classification Search
CPC .......... H04B 10/2575; H04B 10/25751; H04B 10/25752; H04B 10/25753;
(Continued)

(56) References Cited

U.S. PATENT DOCUMENTS

2005/0254820 A1* 11/2005 Zhou ............... H04B 10/25752
   398/83
2009/0154924 A1*  6/2009 Liu .................... H04J 14/0282
   398/58
2017/0307819 A1* 10/2017 Ho ...................... G02B 6/12016

FOREIGN PATENT DOCUMENTS

WO        1999040697 A1    8/1999

* cited by examiner

*Primary Examiner* — Daniel Dobson
(74) *Attorney, Agent, or Firm* — Brad C. Rametta

(57) ABSTRACT

Embodiments of the disclosure relate to wireless distribution systems (WDSs) employing an optical star communications architecture based on quad small form-factor pluggable (QSFP) coarse wavelength division multiplexing (CWDM) transceivers. In one aspect, a selected QSFP CWDM transceiver among one or more QSFP CWDM transceivers wavelength multiplexes a plurality of downlink optical communications signals to generate a WDM downlink communications signal and provides WDM downlink communications signal to a selected remote unit branch among one or more remote unit branches in the WDS. In another aspect, the selected QSFP CWDM transceiver wavelength de-multiplexes a WDM uplink communications signal received from the selected remote unit branch into a plurality of uplink optical communications signals. By supporting an optical star communications architecture based on the selected QSFP CWDM transceiver, it may be possible to reduce total length of optical fibers in the WDS, thus leading to reduced optical fiber material and installation costs.

22 Claims, 7 Drawing Sheets

(58) Field of Classification Search
CPC ......... H04B 10/25754; H04B 10/25756; H04J 14/0232; H04J 14/0238; H04J 14/0239; H04J 14/0247; H04J 14/0252; H04J 14/0278; H04J 14/028; H04J 14/0282
See application file for complete search history.

WIRELESS DISTRIBUTION SYSTEMS (WDSS) EMPLOYING AN OPTICAL STAR COMMUNICATIONS ARCHITECTURE BASED ON QUAD SMALL FORM-FACTOR PLUGGABLE (QSFP) COARSE WAVELENGTH DIVISION MULTIPLEXING (CWDM) TRANSCEIVERS

CROSS REFERENCE TO RELATED APPLICATIONS

This application claims the benefit of priority of U.S. Provisional Application Ser. No. 62/416,306, filed Nov. 2, 2016, the content of which is relied upon and incorporated herein by reference in its entirety.

BACKGROUND

The disclosure relates generally to a wireless distribution system (WDS), such as a distributed antenna system (DAS), and more particularly to supporting an optical star communications architecture in the WDS based on quad small form-factor pluggable (QSFP) transceivers incorporating internal coarse wavelength division multiplexing (CWDM).

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a WDS provided in the form of a DAS 102, wherein 'N' is the number of remote coverage areas. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) communicatively coupled to a central unit 106 (e.g., a head-end equipment, a head-end controller, or a head-end unit). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and a respective antenna 114(1)-114(N) operably coupled to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

The communications medium 112 may be an optical fiber-based communications medium. As such, the remote units 104(1)-104(N) are usually communicatively coupled to the central unit 106 in a star configuration, as shown in FIG. 2. In this regard, FIG. 2 is a schematic diagram of an exemplary WDS 200 in which a central unit 202 is communicatively coupled to a plurality of remote units 204(1)-204(M) based on a conventional optical star communications architecture. The central unit 202 is communicatively coupled to the remote units 204(1)-204(M) via a plurality of optical fiber trunks 206(1)-206(M), respectively. Each of the optical fiber trunks 206(1)-206(M) includes an optical fiber(s) for providing a bidirectional point-to-point communications link(s) between the central unit 202 and a respective remote unit among the remote units 204(1)-204(M). In this regard, a total length of optical fibers required for deploying the WDS 200 based on the conventional optical star communications architecture may be very large, thus causing a significant increase in optical fiber material and installation costs. In addition, it may be necessary to install a new optical fiber trunk(s) when a new remote unit(s) needs to be added into the WDS 200, thus causing the optical fiber material and installation costs to further increase. Hence, it may be desired to reduce the total length of the optical fibers in the conventional optical star communications architecture to save optical fiber material and installation costs.

No admission is made that any reference cited herein constitutes prior art. Applicant expressly reserves the right to challenge the accuracy and pertinency of any cited documents.

SUMMARY

Embodiments of the disclosure relate to wireless distribution systems (WDSs) employing an optical star communications architecture based on quad small form-factor pluggable (QSFP) coarse wavelength division multiplexing (CWDM) transceivers. The WDS may be a distributed antenna system (DAS) as an example. The WDS includes one or more remote unit branches, with each remote unit branch including a plurality of remote units. A central unit in a WDS includes one or more QSFP CWDM transceivers that are coupled to the remote unit branches via one or more optical fiber trunks, respectively. In one aspect, a selected QSFP CWDM transceiver among the QSFP CWDM transceivers is configured to wavelength multiplex a plurality of downlink optical communications signals to generate a WDM downlink communications signal and provide the WDM downlink communications signal to a selected remote unit branch among the remote unit branches in the WDS. In another aspect, the selected QSFP CWDM transceiver is configured to wavelength de-multiplex a WDM uplink communications signal received from the selected remote unit branch into a plurality of uplink optical communications signals. In this regard, the selected QSFP CWDM transceiver is communicatively coupled to the remote units in the selected remote unit branch based on an optical star communications architecture. By supporting an optical star communications architecture based on the use of QSFP CWDM transceivers and relevant optical filter units, it may be possible to reduce the total length of optical fibers required to support the remote unit branches in the WDS, thus leading to reduced optical fiber material and installation costs. Furthermore, replacing a conventional CWDM transceiver with a smaller QSFP CWDM transceiver makes it possible to provide the QSFP CWDM transceivers in the central unit without exacerbating front panel density issues in the central unit.

In this regard, in one aspect, a WDS is provided. The WDS includes one or more remote unit branches, each comprising a plurality of remote units and configured to carry a respective WDM downlink communications signal among one or more WDM downlink communications signals to the respective plurality of remote units in the remote unit branch and carry a respective WDM uplink communications signal among one or more WDM uplink communications signals from the respective plurality of remote units in the remote unit branch. The WDS also includes a central unit comprising one or more QSFP CWDM transceivers communicatively coupled to the one or more remote unit branches via one or more optical fiber trunks, respectively. A selected QSFP CWDM transceiver among the one or more QSFP CWDM transceivers is configured to receive and wavelength multiplex a plurality of downlink optical communications signals to generate a WDM downlink communications signal among the one or more WDM downlink communications signals. The selected QSFP CWDM transceiver among the one or more QSFP CWDM transceivers is also configured to provide the WDM downlink communications signal to a selected remote unit branch among the one or more remote unit branches over a selected optical fiber trunk among the one or more optical fiber trunks. The selected QSFP CWDM transceiver among the one or more QSFP CWDM transceivers is also configured to receive a WDM uplink communications signal among the one or more WDM uplink communications signals from the selected remote unit branch via the selected optical fiber trunk. The selected QSFP CWDM transceiver among the one or more QSFP CWDM transceivers is also configured to wavelength de-multiplex the WDM uplink communications signal into a plurality of uplink optical communications signals.

In another aspect, a method for supporting an optical star communications architecture based on QSFP CWDM in a WDS is provided. The method includes receiving and wavelength multiplexing a plurality of downlink optical communications signals to generate a WDM downlink communications signal by a selected QSFP CWDM transceiver among one or more QSFP CWDM transceivers. The method also includes providing the WDM downlink communications signal from the selected QSFP CWDM transceiver to a selected remote unit branch among one or more remote unit branches via a selected optical fiber trunk among one or more optical fiber trunks. The method also includes receiving a WDM uplink communications signal by the selected QSFP CWDM transceiver from the selected remote unit branch via the selected optical fiber trunk. The method also includes wavelength de-multiplexing the WDM uplink communications signal into a plurality of uplink optical communications signals.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to wireless distribution systems (WDSs) employing an optical star communications architecture based on quad small form-factor pluggable (QSFP) coarse wavelength division multiplexing (CWDM) transceivers. The WDS may be a distributed antenna system (DAS) as an example. The WDS includes one or more remote unit branches, with each remote unit branch including a plurality of remote units. A central unit in a WDS includes one or more QSFP CWDM transceivers that are coupled to the remote unit branches via one or more optical fiber trunks, respectively. In one aspect, a selected QSFP CWDM transceiver among the QSFP CWDM transceivers is configured to wavelength multiplex a plurality of downlink optical communications signals to generate a WDM downlink communications signal and provide the WDM downlink communications signal to a selected remote unit branch among the remote unit branches in the WDS. In another aspect, the selected QSFP CWDM transceiver is configured to wavelength de-multiplex a WDM uplink communications signal received from the selected remote unit branch into a plurality of uplink optical communications signals. In this regard, the selected QSFP CWDM transceiver is communicatively coupled to the remote units in the selected remote unit branch based on an optical star communications architecture. By supporting an optical star communications architecture based on the use of QSFP CWDM transceivers and relevant optical filter units, it may be possible to reduce the total length of optical fibers required to support the remote unit branches in the WDS, thus leading to reduced optical fiber material and installation costs. Furthermore, replacing a conventional CWDM transceiver with a smaller QSFP CWDM transceiver makes it possible to provide the QSFP CWDM transceivers in the central unit without exacerbating front panel density issues in the central unit.

Figure 3:
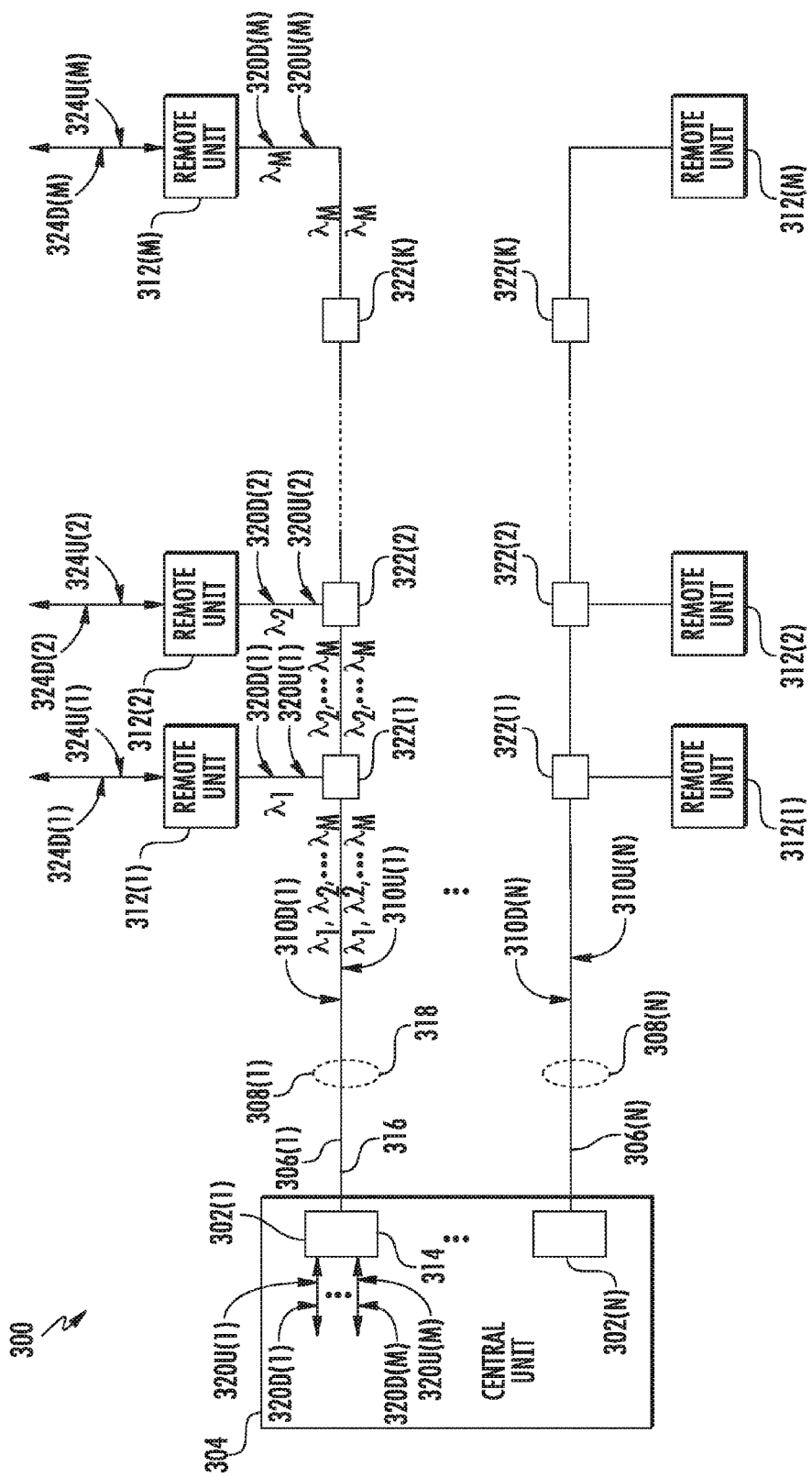
FIG. 3 is a schematic diagram of an exemplary WDS in which one or more quad small form-factor pluggable (QSFP) coarse wavelength division multiplexing (CWDM) transceivers provided in a central unit are communicatively coupled to one or more remote unit branches via one or more optical fiber trunks to support an optical star communications architecture in the WDS.

In this regard, FIG. 3 is a schematic diagram of an exemplary WDS 300 in which one or more QSFP CWDM transceivers 302(1)-302(N) in a central unit 304 are communicatively coupled to one or more remote unit branches 306(1)-306(N) via one or more optical fiber trunks 308(1)-308(N) to support an optical star communications architecture. In a non-liming example, each of the QSFP CWDM transceivers 302(1)-302(N) is a QSFP transceiver incorporating internal CWDM functionality. The remote unit branches 306(1)-306(N) are configured to carry one or more WDM downlink communications signals 310D(1)-310D(N) and one or more WDM uplink communications signals 310U(1)-310U(N) with the QSFP CWDM transceivers 302(1)-302(N) in the central unit 304, respectively. Each of the remote unit branches 306(1)-306(N) includes a plurality of remote units 312(1)-312(M) (M≤4), wherein M may be the same or different between each of the remote unit branches 306(1)-306(N). In this regard, a selected QSFP CWDM transceiver 314, which may be the QSFP CWDM transceiver 302(1) among the QSFP CWDM transceivers 302(1)-302(N) for example, is communicatively coupled to the remote units 312(1)-312(M) in a selected remote unit branch 316, which may be the remote unit branch 306(1) among the remote unit branches 306(1)-306(N) for example, based on the optical star communications architecture.

For the convenience of illustration, the selected QSFP CWDM transceiver 314 and the selected remote unit branch 316 are discussed hereinafter as non-limiting examples. It shall be appreciated that the selected QSFP CWDM transceiver 314 can be any of the QSFP CWDM transceivers 302(1)-302(N), and the selected remote unit branch 316 can be any of the remote unit branches 306(1)-306(N). As such, the configuration and operational principles discussed with reference to the selected QSFP CWDM transceiver 314 and the selected remote unit branch 316 are applicable to any of the QSFP CWDM transceivers 302(1)-302(N) and any of the remote unit branches 306(1)-306(N) as well.

Figure 1:
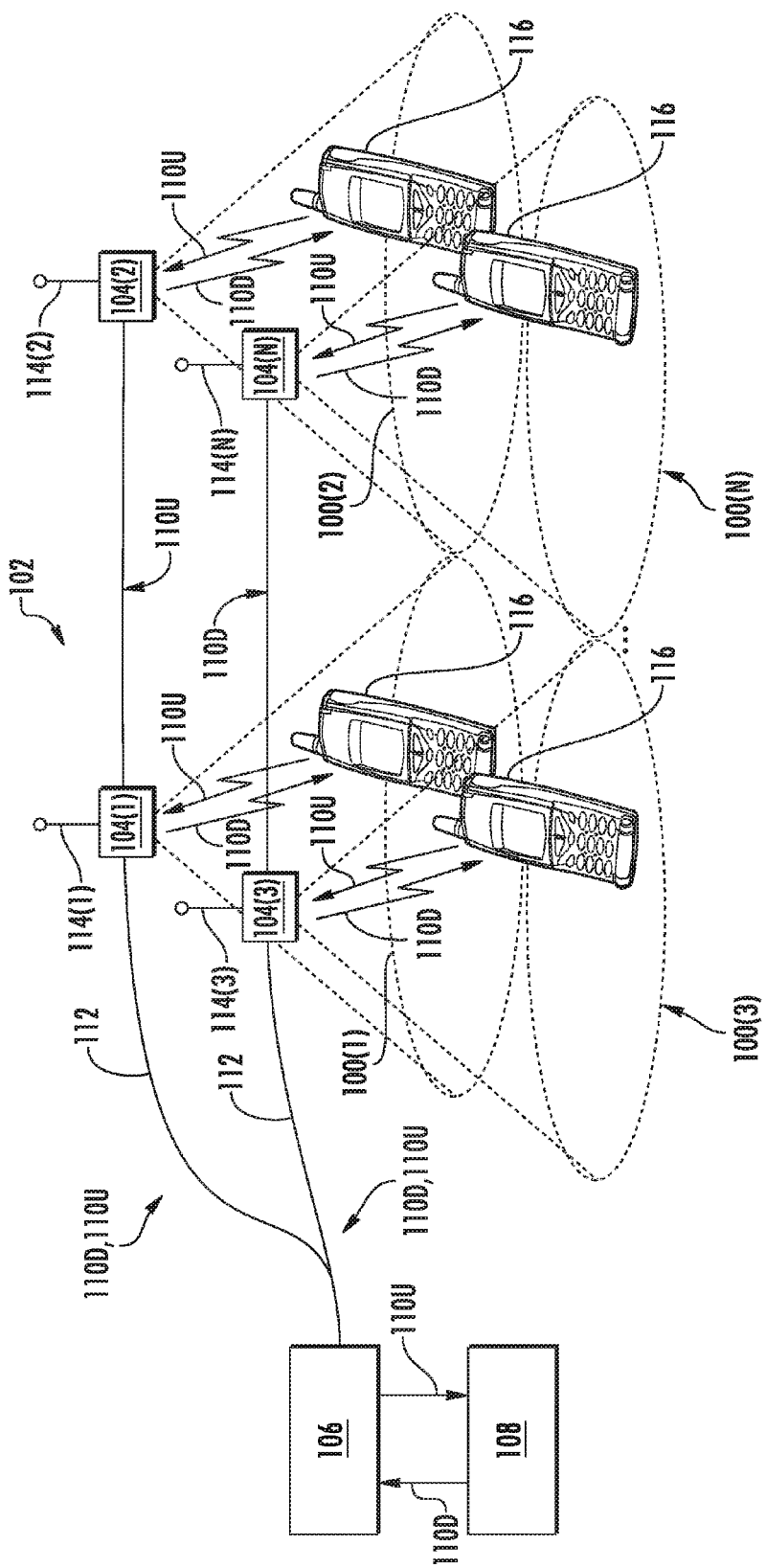
FIG. 1 is a schematic diagram of an exemplary wireless distribution system (WDS), which may be a distributed antenna system (DAS) for example.
Figure 2:
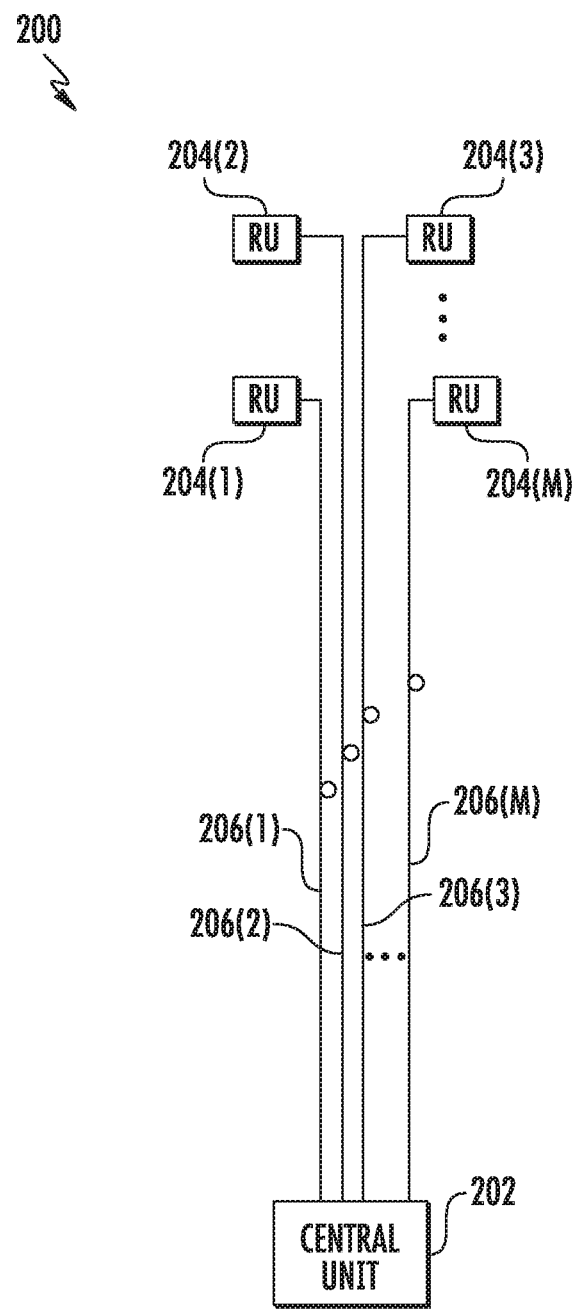
FIG. 2 is a schematic diagram of an exemplary WDS in which a central unit is communicatively coupled to a plurality of remote units according to a conventional optical star communications architecture.

With reference to FIG. 3, the selected QSFP CWDM transceiver 314 is communicatively coupled to the selected remote unit branch 316 via a selected optical fiber trunk 318, which may be the optical fiber trunk 308(1) among the optical fiber trunks 308(1)-308(N) for example. As such, the selected optical fiber trunk 318 can support the optical star communications architecture between the selected QSFP CWDM transceiver 314 and the remote units 312(1)-312(M) in the selected remote unit branch 316. In contrast, if the selected QSFP CWDM transceiver 314 were communicatively coupled to the remote units 312(1)-312(M) according to the conventional optical star communications architecture discussed above in FIG. 2, multiple optical fiber trunks would be required to be installed between the selected QSFP CWDM transceiver 314 and the remote units 312(1)-312(M). In this regard, the total length of optical fibers required by the optical star communications architecture is significantly shorter than the total length of optical fibers required by the conventional optical star communications architecture of FIG. 2. Hence, by supporting the optical star communications architecture based on the selected QSFP CWDM transceiver 314 in FIG. 3, it may be possible to reduce the optical fiber material and installation costs in the WDS 300. Furthermore, because the smaller form-factor of the QSFP CWDM transceivers 302(1)-302(N) are relatively small, the QSFP CWDM transceivers 302(1)-302(N) may be installed without occupying excessive front panel area in the central unit 304. As a result, it may be possible to provide the QSFP CWDM transceivers 302(1)-302(N) in the central unit 304 without exacerbating front panel density issues in the central unit 304.

With continuing reference to FIG. 3, the selected QSFP CWDM transceiver 314 receives a plurality of downlink optical communications signals 320D(1)-320D(M). The selected QSFP CWDM transceiver 314 wavelength multiplexes the downlink optical communications signals 320D(1)-320D(M) based on wavelengths $\lambda_1$-$\lambda_m$, respectively, to generate the WDM downlink communications signal 310D(1) among the WDM downlink communications signals 310D(1)-310D(N). The selected QSFP CWDM transceiver 314 provides the WDM downlink communications signal 310D(1) to the selected remote unit branch 316 via the selected optical fiber trunk 318. The selected QSFP CWDM transceiver 314 also receives the WDM uplink communications signal 310U(1) among the WDM uplink communications signals 310U(1)-310U(N) from the selected remote unit branch 316 via the selected optical fiber trunk 318. The selected QSFP CWDM transceiver 314 wavelength de-multiplexes the WDM uplink communications signal 310U(1) into a plurality of uplink optical communications signals 320U(1)-320U(M) based on the wavelengths $\lambda_1$-$\lambda_M$, respectively.

Figure 4:
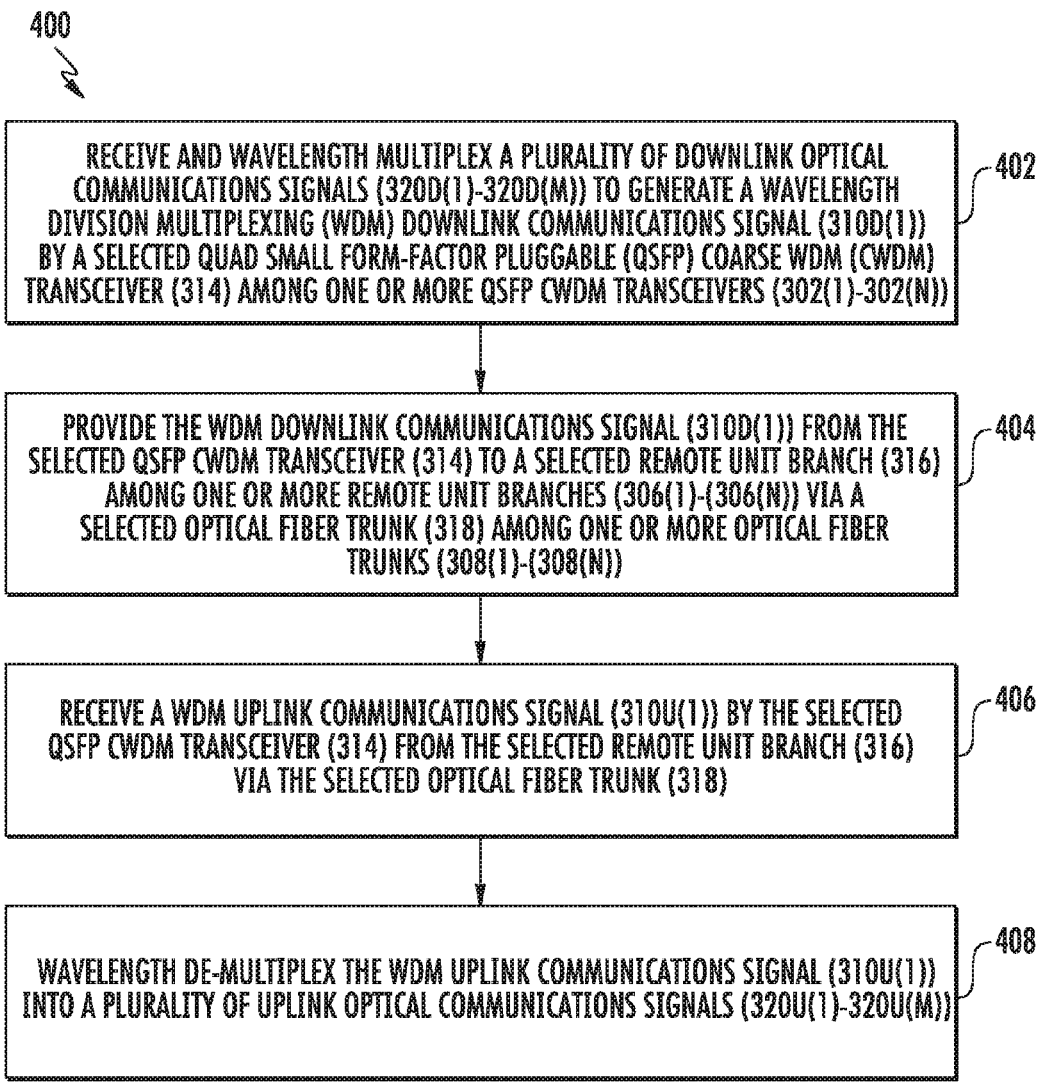
FIG. 4 is a flowchart of an exemplary process that may be employed to configure the WDS of FIG. 3 to control the QSFP CWDM transceivers therein to support an optical star communications architecture based on the QSFP CWDM transceivers in the central unit.

The central unit 304 may be configured to support the optical star communications architecture in the WDS 300 according to a process. In this regard, FIG. 4 is a flowchart of an exemplary process 400 that may be employed to configure the WDS 300 of FIG. 3 to control the QSFP CWDM transceivers 302(1)-302(N) to support the optical star communications architecture based on the QSFP CWDM transceivers 302(1)-302(N) in the central unit 304.

According to the process 400, the selected QSFP CWDM transceiver 314 receives and wavelength multiplexes the downlink optical communications signals 320D(1)-320D(M) to generate the WDM downlink communications signal 310D(1) (block 402). The selected QSFP CWDM transceiver 314 provides the WDM downlink communications signal 310D(1) to the selected remote unit branch 316 via the selected optical fiber trunk 318 (block 404). The selected QSFP CWDM transceiver 314 receives the WDM uplink communications signal 310U(1) from the selected remote unit branch 316 via the selected optical fiber trunk 318 (block 406). The selected QSFP CWDM transceiver 314 wavelength de-multiplexes the WDM uplink communications signal 310U(1) into the uplink optical communications signals 320U(1)-320U(M) (block 408).

With reference back to FIG. 3, the remote unit branches 306(1)-306(N) each include one or more CWDM transceivers 322(1)-322(K), wherein K may be the same or different between the remote unit branches 306(1)-306(N). In this regard, the selected remote unit branch 316 includes the CWDM transceivers 322(1)-322(K) that are configured to receive and wavelength de-multiplex the WDM downlink communications signal 310D(1) into the downlink optical communications signals 320D(1)-320D(M). In a non-limiting example, the CWDM transceiver 322(1) receives the WDM downlink communications signal 310D(1) that includes the downlink optical communications signals 320D(1)-320D(M) at wavelengths $\lambda_1$-$\lambda_M$, respectively. The CWDM transceiver 322(1) wavelength de-multiplexes the downlink optical communications signal 320D(1) at the wavelength $\lambda_1$ and provides the downlink optical communications signal 320D(1) to the remote unit 312(1). Likewise, the CWDM transceiver 322(2) wavelength de-multiplexes the downlink optical communications signal 320D(2) at the wavelength $\lambda_2$ and provides the downlink optical communications signal 320D(2) to the remote unit 312(2). Accordingly, the CWDM transceiver 322(K) wavelength de-multiplexes the downlink optical communications signal 320D(M) at the wavelength $\lambda_M$ and provides the downlink optical communications signal 320D(M) to the remote unit 312(M). The remote units 312(1)-312(M) in the selected remote unit branch 316 receive and convert the downlink optical communications signals 320D(1)-320D(M) into a plurality of downlink radio frequency (RF) communications signals 324D(1)-324D(M), respectively, for distribution to client devices.

The remote units 312(1)-312(M) in the selected remote unit branch 316 also receive a plurality of uplink RF communications signals 324U(1)-324U(M), respectively, from the client devices. The remote units 312(1)-312(M) convert the uplink RF communications signals 324U(1)-324U(M) into the uplink optical communications signals 320U(1)-320U(M), respectively. The CWDM transceivers 322(1)-322(K) in the selected remote unit branch 316 wavelength multiplex the uplink optical communications signals 320U(1)-320U(M) into the WDM uplink communications signal 310U(1), and provide the WDM uplink communications signal 310U(1) to the selected QSFP CWDM transceiver 314 in the central unit 304 via the selected optical fiber trunk 318. In a non-limiting example, the CWDM transceiver 322(K) wavelength multiplexes the uplink optical communications signal 320U(M) into the WDM uplink communications signal 310U(1) at the wavelength $\lambda_M$. Likewise, the CWDM transceiver 322(1) wavelength multiplexes the uplink optical communications signal 320U(1) into the WDM uplink communications signal 310U(1) at the wavelength $\lambda_1$. At this point, the WDM uplink communications signal 310U(1) includes uplink optical communications signals 320U(1)-320U(M) at the wavelengths $\lambda_1$-$\lambda_M$, respectively.

Figure 5:
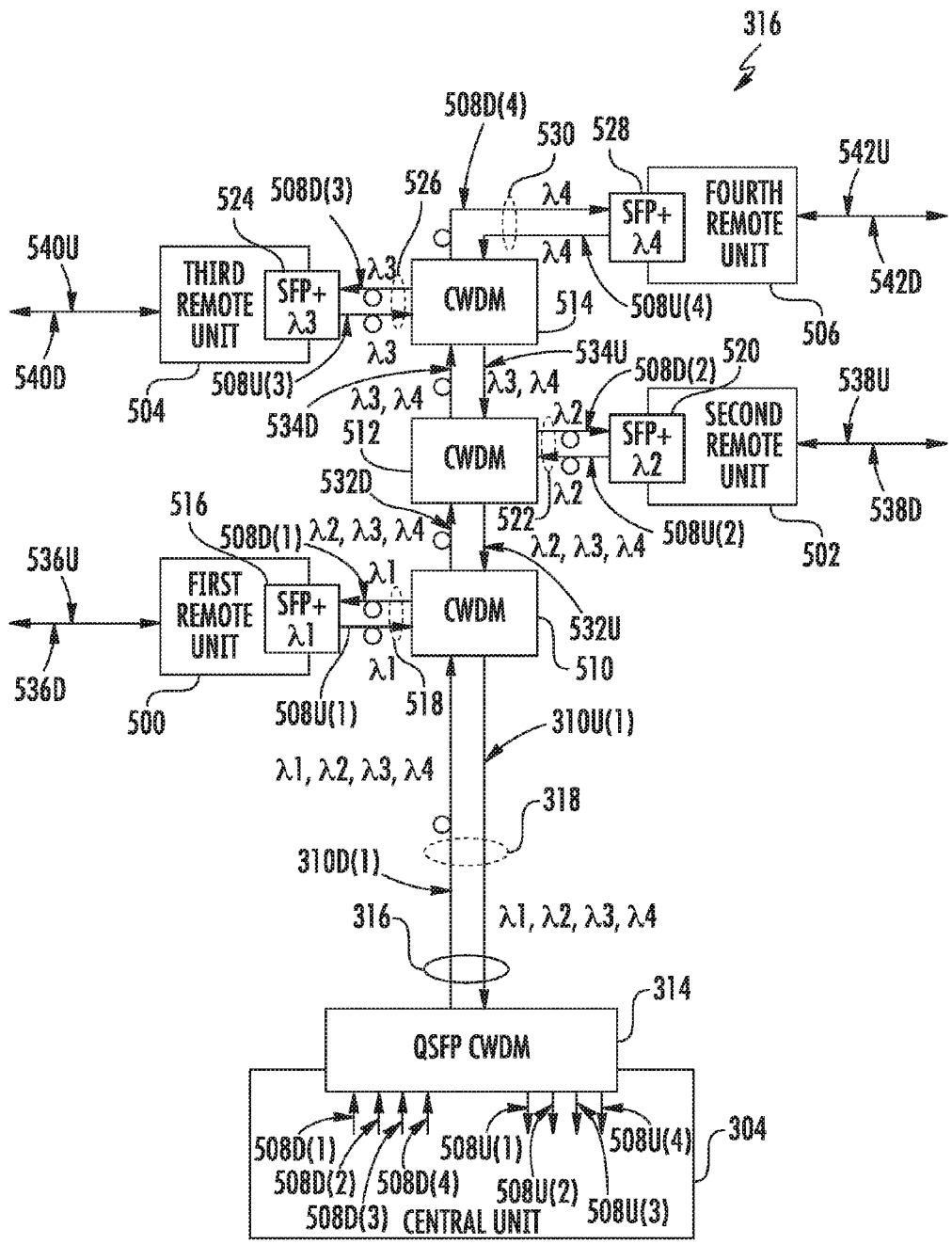
FIG. 5 is a schematic diagram providing an exemplary illustration of a selected remote unit branch among the one or more remote unit branches in the WDS in FIG. 3 that includes four remote units communicatively coupled to a selected QSFP CWDM transceiver based on a virtual optical star communications architecture.

The selected QSFP CWDM transceiver 314 may be configured to enable multiple point-to-point communications between the central unit 304 and the remote units 312(1)-312(M) in the selected remote unit branch 316. For example, the selected QSFP CWDM transceiver 314 may be configured to distribute the WDM downlink communications signal 310D(1) to a remote QSFP CWDM transceiver disposed at an opposite end of the selected remote unit branch 316. In this regard, the selected QSFP CWDM transceiver 314 communicates with the remote QSFP CWDM transceiver via a point-to-point optical fiber-based communications link. However, it may be desired to configure the selected QSFP CWDM transceiver 314 to support a virtual optical star communications architecture to enable add-and-drop installation of the remote units 312(1)-312(M) in the selected remote unit branch 316. In this regard, FIG. 5 is a schematic diagram providing an exemplary illustration of the selected remote unit branch 316 of FIG. 3, which includes a first remote unit 500, a second remote unit 502, a third remote unit 504, and a fourth remote 506, communicatively coupled to the selected QSFP CWDM transceiver 314 based on a virtual optical star communications architecture. Common elements between FIGS. 3 and 5 are shown therein with common element numbers and will not be re-described herein.

With reference to FIG. 5, the selected QSFP CWDM transceiver 314 receives and wavelength multiplexes a first downlink optical communications signal 508D(1), a second downlink optical communications signal 508D(2), a third downlink optical communications signal 508D(3), and a fourth downlink optical communications signal 508D(4) based on a first wavelength $\lambda_1$, a second wavelength $\lambda_2$, a third wavelength $\lambda_3$, and a fourth wavelength $\lambda_4$, respectively, to generate the WDM downlink communications signal 310D(1). The selected QSFP CWDM transceiver 314 provides the WDM downlink communications signal 310D(1) to the selected remote unit branch 316 via the selected optical fiber trunk 318.

The selected remote unit branch 316 includes a first CWDM transceiver 510 that is coupled to the selected optical fiber trunk 318. The selected remote unit branch 316 also includes a second CWDM transceiver 512 that is coupled to the selected optical fiber trunk 318 via the first CWDM transceiver 510. The selected remote unit branch 316 also includes a third CWDM transceiver 514 that is coupled to the selected optical fiber trunk 318 via the second CWDM transceiver 512.

The selected remote unit branch 316 includes a first optical filter 516 that is coupled to the first CWDM transceiver 510 via a first local optical fiber link 518. The first optical filter 516 is configured to pass the first downlink optical communications signal 508D(1) based on the first wavelength $\lambda_1$. The selected remote unit branch 316 also includes a second optical filter 520 that is coupled to the second CWDM transceiver 512 via a second local optical fiber link 522. The second optical filter 520 is configured to pass the second downlink optical communications signal 508D(2) based on the second wavelength $\lambda_2$. The selected remote unit branch 316 also includes a third optical filter 524 that is coupled to the third CWDM transceiver 514 via a third local optical fiber link 526. The third optical filter 524 is configured to pass the third downlink optical communications signal 508D(3) based on the third wavelength $\lambda_3$. The selected remote unit branch 316 also includes a fourth optical filter 528 that is coupled to the third CWDM transceiver 514 via a fourth local optical fiber link 530. The fourth optical filter 528 is configured to pass the fourth downlink optical communications signal 508D(4) based on the fourth wavelength $\lambda_4$.

In this regard, the first remote unit 500 is coupled to the first optical filter 516 to receive the first downlink optical communications signal 508D(1). Likewise, the second remote unit 502 is coupled to the second optical filter 520 to receive the second downlink optical communications signal 508D(2), the third remote unit 504 is coupled to the third optical filter 524 to receive the third downlink optical communications signal 508D(3), and the fourth remote unit 506 is coupled to the fourth optical filter 528 to receive the fourth downlink optical communications signal 508D(4). In one non-limiting example, the first optical filter 516, the second optical filter 520, the third optical filter 524, and the fourth optical filter 528 can be provided inside the first remote unit 500, the second remote unit 502, the third remote unit 504, and the fourth remote unit 506, respectively. In another non-limiting example, the first optical filter 516, the second optical filter 520, the third optical filter 524, and the fourth optical filter 528 can be provided independent of (e.g., outside of) the first remote unit 500, the second remote unit 502, the third remote unit 504, and the fourth remote unit 506, respectively.

The first CWDM transceiver 510 is configured to receive the WDM downlink communications signal 310D(1), which includes the first downlink optical communications signal 508D(1), the second downlink optical communications signal 508D(2), the third downlink optical communications signal 508D(3), and the fourth downlink optical communications signal 508D(4). The first CWDM transceiver 510 wavelength de-multiplexes the first downlink optical communications signal 508D(1) from the WDM downlink communications signal 310D(1) and provides the first downlink optical communications signal 508D(1) to the first optical filter 516. The first CWDM transceiver 510 then provides a second WDM downlink communications signal 532D, which includes the second downlink optical communications signal 508D(2), the third downlink optical communications signal 508D(3), and the fourth downlink optical communications signal 508D(4), to the second CWDM transceiver 512. The first remote unit 500 receives the first downlink optical communications signal 508D(1) from the first optical filter 516 and converts the first downlink optical communications signal 508D(1) into a first downlink RF communications signal 536D for distribution to one or more first client devices.

The second CWDM transceiver 512 is configured to receive the second WDM downlink communications signal 532D, which includes the second downlink optical communications signal 508D(2), the third downlink optical communications signal 508D(3), and the fourth downlink optical communications signal 508D(4). The second CWDM transceiver 512 wavelength de-multiplexes the second downlink optical communications signal 508D(2) from the second WDM downlink communications signal 532D and provides the second downlink optical communications signal 508D(2) to the second optical filter 520. The second CWDM transceiver 512 then provides a third WDM downlink communications signal 534D, which includes the third downlink optical communications signal 508D(3) and the fourth downlink optical communications signal 508D(4), to the third CWDM transceiver 514. The second remote unit 502 receives the second downlink optical communications signal 508D(2) from the second optical filter 520 and converts the second downlink optical communications signal 508D(2) into a second downlink RF communications signal 538D for distribution to one or more second client devices.

The third CWDM transceiver 514 is configured to receive the third WDM downlink communications signal 534D, which includes the third downlink optical communications signal 508D(3) and the fourth downlink optical communications signal 508D(4). The third CWDM transceiver 514 wavelength de-multiplexes the third downlink optical communications signal 508D(3) and the fourth downlink optical communications signal 508D(4) from the third WDM downlink communications signal 534D. The third CWDM transceiver 514 provides the third downlink optical communications signal 508D(3) and the fourth downlink optical communications signal 508D(4) to the third optical filter 524 and the fourth optical filter 528, respectively. The third remote unit 504 receives the third downlink optical communications signal 508D(3) from the third optical filter 524 and converts the third downlink optical communications signal 508D(3) into a third downlink RF communications signal 540D for distribution to one or more third client devices. The fourth remote unit 506 receives the fourth downlink optical communications signal 508D(4) from the fourth optical filter 528 and converts the fourth downlink optical communications signal 508D(4) into a fourth downlink RF communications signal 542D for distribution to one or more fourth client devices.

With continuing reference to FIG. 5, the third remote unit 504 is configured to convert a third uplink RF communications signal 540U received from the third client devices into a third uplink optical communications signal 508U(3). The third remote unit 504 provides the third uplink optical communications signal 508U(3) to the third optical filter 524, which provides the third uplink optical communications signal 508U(3) to the third CWDM transceiver 514 with the third wavelength $\lambda_3$. The fourth remote unit 506 is configured to convert a fourth uplink RF communications signal 542U received from the fourth client devices into a fourth uplink optical communications signal 508U(4). The fourth remote unit 506 provides the fourth uplink optical communications signal 508U(4) to the fourth optical filter 528, which provides the fourth uplink optical communications signal 508U(4) to the third CWDM transceiver 514 with the fourth wavelength $\lambda_4$. The third CWDM transceiver 514 is configured to wavelength multiplex the third uplink optical communications signal 508U(3) with the fourth uplink optical communications signal 508U(4) into a third WDM uplink communications signal 534U, which includes the third uplink optical communications signal 508U(3) and the fourth uplink optical communications signal 508U(4). The third CWDM transceiver 514 provides the third WDM uplink communications signal 534U to the second CWDM transceiver 512.

The second remote unit 502 is configured to convert a second uplink RF communications signal 538U received from the second client devices into a second uplink optical communications signal 508U(2). The second remote unit 502 provides the second uplink optical communications signal 508U(2) to the second optical filter 520, which provides the second uplink optical communications signal 508U(2) to the second CWDM transceiver 512 with the second wavelength $\lambda_2$. The second CWDM transceiver 512 is configured to wavelength multiplex the second uplink optical communications signal 508U(2) with the third WDM uplink communications signal 534U into a second WDM uplink communications signal 532U, which includes the second uplink optical communications signal 508U(2), the third uplink optical communications signal 508U(3), and the fourth uplink optical communications signal 508U(4). The second CWDM transceiver 512 provides the second WDM uplink communications signal 532U to the first CWDM transceiver 510.

The first remote unit 500 is configured to convert a first uplink RF communications signal 536U received from the first client devices into a first uplink optical communications signal 508U(1). The first remote unit 500 provides the first uplink optical communications signal 508U(1) to the first optical filter 516, which provides the first uplink optical communications signal 508U(1) to the first CWDM transceiver 510 with the first wavelength λ₁. The first CWDM transceiver 510 is configured to wavelength multiplex the first uplink optical communications signal 508U(1) with the second WDM uplink communications signal 532U into the WDM uplink communications signal 310U(1), which includes the first uplink optical communications signal 508U(1), the second uplink optical communications signal 508U(2), the third uplink optical communications signal 508U(3), and the fourth uplink optical communications signal 508U(4). The first CWDM transceiver 510 provides the WDM uplink communications signal 310U(1) to the selected QSFP CWDM transceiver 314 in the central unit 304 via the selected optical fiber trunk 318.

Figure 6:
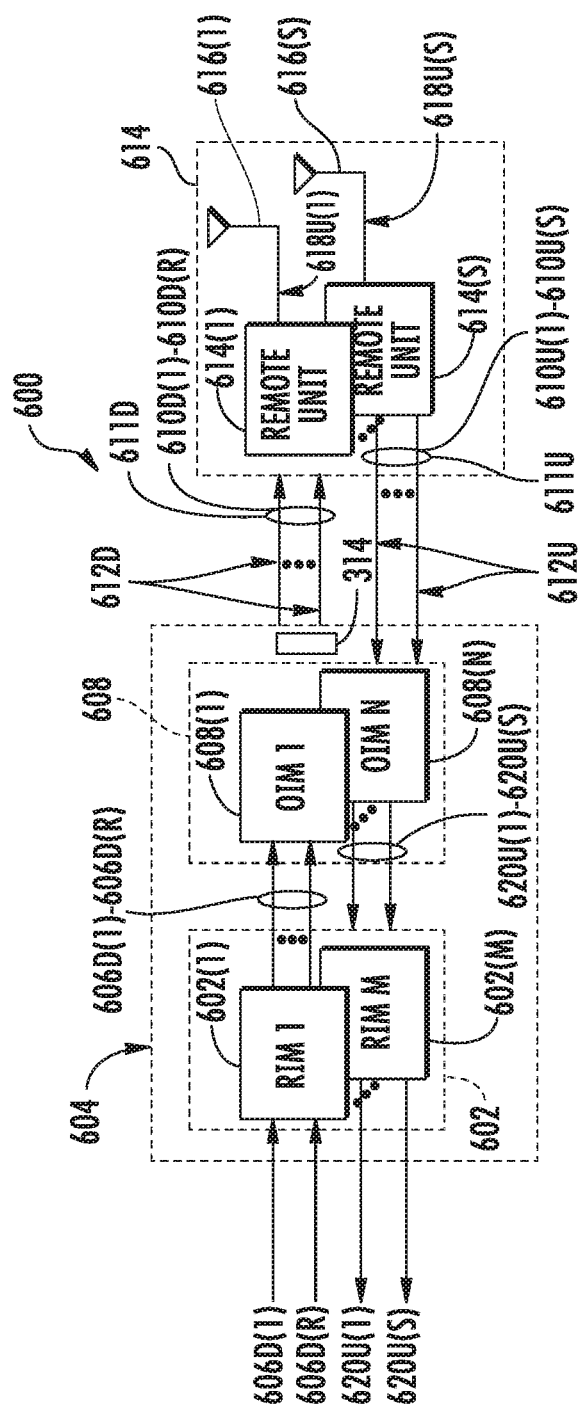
FIG. 6 is a schematic diagram of an exemplary WDS provided in the form of an optical fiber-based WDS that includes a central unit, such as the central unit of FIG. 3, configured to support the optical star communications architecture based on the one or more QSFP CWDM transceivers.

FIG. 6 is a schematic diagram of an exemplary WDS 600 provided in the form of an optical fiber-based WDS that can include a central unit, including the central unit 304 of FIG. 3, configured to support an optical star communications architecture based on the QSFP CWDM transceivers 302(1)-302(N). The WDS 600 includes an optical fiber for distributing communications services for multiple frequency bands. The WDS 600 in this example is comprised of three (3) main components in this example. One or more interfaces provided in the form of radio interface modules (RIMs) 602(1)-602(M) are provided in a central unit 604 to receive and process a plurality of downlink communications signals 606D(1)-606D(R) prior to optical conversion into downlink optical communications signals. The downlink communications signals 606D(1)-606D(R) may be received from a base station as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602(12). Each RIM 602(1)-602(M) can be designed to support a particular type of radio source or range of radio sources (i.e., frequencies) to provide flexibility in configuring the central unit 604 and the WDS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink communications signals 606D(1)-606D(R) are provided to one or more optical interfaces provided in the form of optical interface modules (OIMs) 608(1)-608(N) in this embodiment to convert the downlink communications signals 606D(1)-606D(R) into downlink optical communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink communications signals 606D(1)-606D(R) into the downlink optical communications signals 610D(1)-610D(R). The downlink optical communications signals 610D(1)-610D(R) are communicated to the selected QSFP CWDM transceiver 314 in the central unit 604, which is configured to wavelength multiplex the downlink optical communications signals 610D(1)-610D(R) into a WDM downlink communications signal 611D. The selected QSFP CWDM transceiver 314 distributes the WDM downlink communications signal 611D over a downlink optical fiber-based communications medium 612D, which may part of the selected optical fiber trunk 318 of FIG. 3, to a plurality of remote units 614(1)-614(S), which can be associated with the selected remote unit branch 316 of FIG. 3 for example. The notation "1-S" indicates that any number of the referenced component 1-S may be provided. Remote unit O/E converters provided in the remote units 614(1)-614(S) convert the downlink optical communications signals 610D(1)-610D(R) back into the downlink communications signals 606D(1)-606D(R), which are provided to antennas 616(1)-616(S) in the remote units 614(1)-614(S) to client devices in the reception range of the antennas 616(1)-616(S).

Remote unit E/O converters are also provided in the remote units 614(1)-614(S) to convert a plurality of uplink communications signals 618U(1)-618U(S) received from the client devices through the antennas 616(1)-616(S) into uplink optical communications signals 610U(1)-610U(S). The remote units 614(1)-614(S) may be coupled to the CWDM transceivers 322(1)-322(K) of FIG. 3, which are configured to wavelength multiplex the uplink optical communications signals 610U(1)-610U(S) into a WDM uplink communications signal 611U. The WDM uplink communications signal 611U is provided to the selected QSFP CWDM transceiver 314 in the central unit 604 over an uplink optical fiber-based communications medium 612U, which may be part of the selected optical fiber trunk 318 of FIG. 3. The selected QSFP CWDM transceiver 314 wavelength de-multiplexes the WDM uplink communications signal 611U into the uplink optical communications signals 610U(1)-610U(S). The OIMs 608(1)-608(N) include O/E converters that convert the uplink optical communications signals 610U(1)-610U(S) into uplink communications signals 620U(1)-620U(S), which are processed by the RIMs 602(1)-602(M) and provided as the uplink communications signals 620U(1)-620U(S). The central unit 604 may provide the uplink communications signals 620U(1)-620U(S) to a base station or other communications system.

Figure 7:
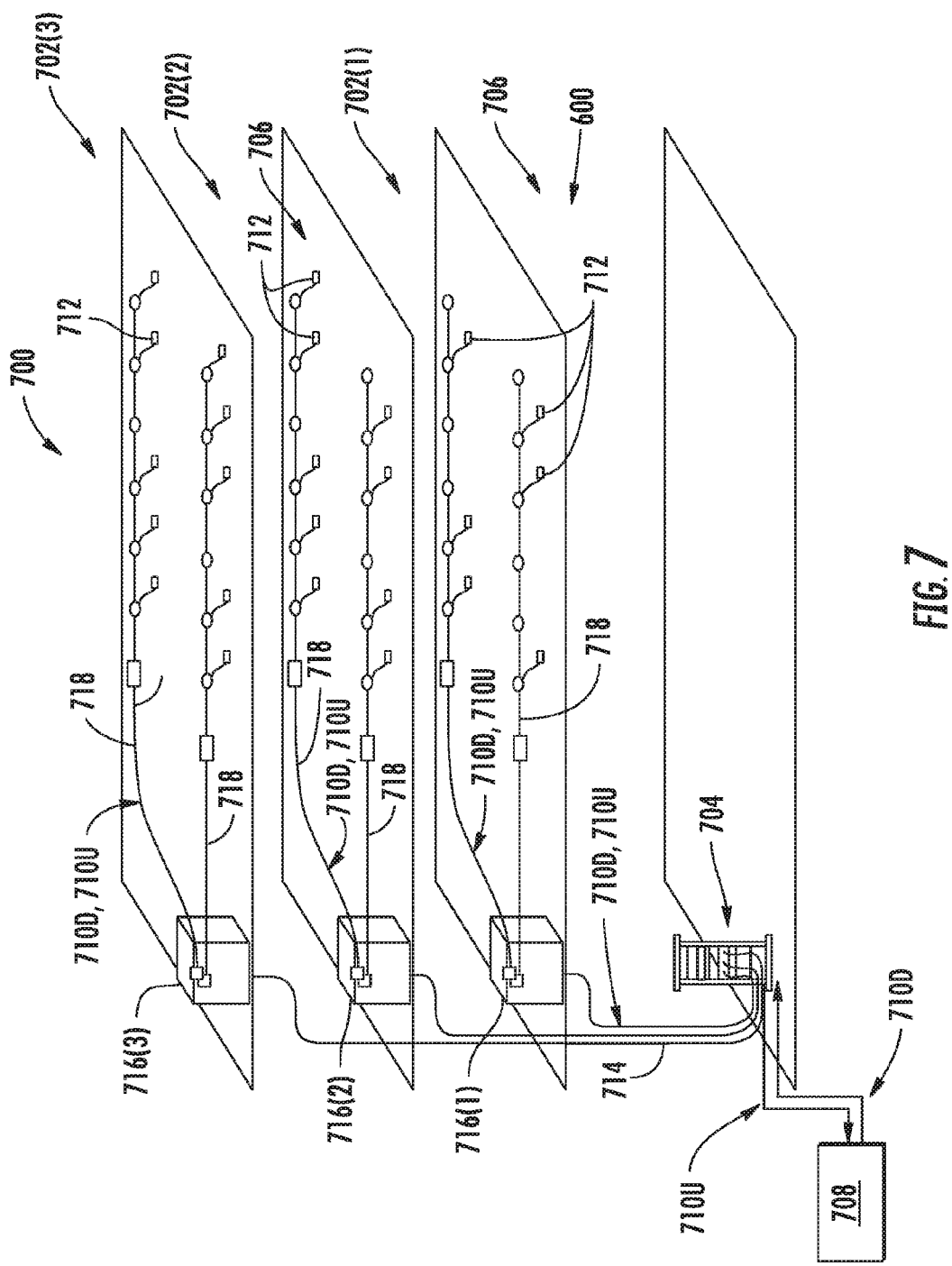
FIG. 7 is a partial schematic cut-away diagram of an exemplary building infrastructure in which a WDS, including the WDS of FIG. 6, can be provided that includes a central unit, such as the central unit of FIG. 3, configured to support the optical star communications architecture based on the one or more QSFP CWDM transceivers.

The WDS 600 of FIG. 6 may be provided in an indoor environment, as illustrated in FIG. 7. FIG. 7 is a partial schematic cut-away diagram of an exemplary building infrastructure 700 in which a WDS, including the WDS 600 of FIG. 6, can be provided that includes a central unit, such as the central unit 304 of FIG. 3, configured to support an optical star communications architecture based on the QSFP CWDM transceivers 302(1)-302(N). The building infrastructure 700 in this embodiment includes a first (ground) floor 702(1), a second floor 702(2), and a third floor 702(3). The floors 702(1)-702(3) are serviced by a central unit 704, which may be the central unit 304, to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
one or more remote unit branches each comprising a plurality of remote units and configured to carry a respective wavelength division multiplexing (WDM) downlink communications signal among one or more WDM downlink communications signals to the respective plurality of remote units in the remote unit branch and carry a respective WDM uplink communications signal among one or more WDM uplink communications signals from the respective plurality of remote units in the remote unit branch; and
a central unit comprising one or more quad small form-factor pluggable (QSFP) coarse WDM (CWDM) transceivers communicatively coupled to the one or more remote unit branches via one or more optical fiber trunks, respectively;
wherein a selected QSFP CWDM transceiver among the one or more QSFP CWDM transceivers is configured to:
receive and wavelength multiplex a plurality of downlink optical communications signals to generate a WDM downlink communications signal among the one or more WDM downlink communications signals;
provide the WDM downlink communications signal to a selected remote unit branch among the one or more remote unit branches over a selected optical fiber trunk among the one or more optical fiber trunks;
receive a WDM uplink communications signal among the one or more WDM uplink communications signals from the selected remote unit branch via the selected optical fiber trunk; and
wavelength de-multiplex the WDM uplink communications signal into a plurality of uplink optical communications signals.

2. The WDS of claim 1, wherein:
the selected remote unit branch further comprises one or more CWDM transceivers configured to receive and wavelength de-multiplex the WDM downlink communications signal into the plurality of downlink optical communications signals; and
the plurality of remote units is configured to receive and convert the plurality of downlink optical communications signals into a plurality of downlink radio frequency (RF) communications signals for distribution to client devices.

3. The WDS of claim 2, wherein:
the plurality of remote units is further configured to:
receive a plurality of uplink RF communications signals from the client devices; and
convert the plurality of uplink RF communications signals into the plurality of uplink optical communications signals; and
the one or more CWDM transceivers are further configured to:
wavelength multiplex the plurality of uplink optical communications signals into the WDM uplink communications signal; and
provide the WDM uplink communications signal to the selected QSFP CWDM transceiver in the central unit via the selected optical fiber trunk.

4. The WDS of claim 1, wherein the selected QSFP CWDM transceiver among the one or more QSFP CWDM transceivers is configured to:
receive and wavelength multiplex a first downlink optical communications signal, a second downlink optical communications signal, a third downlink optical communications signal, and a fourth downlink optical communications signal based on a first wavelength, a second wavelength, a third wavelength, and a fourth wavelength, respectively, to generate the WDM downlink communications signal among the one or more WDM downlink communications signals; and
provide the WDM downlink communications signal to the selected remote unit branch via the selected optical fiber trunk.

5. The WDS of claim 4, wherein the selected remote unit branch comprises:
a first CWDM transceiver coupled to the selected optical fiber trunk;
a second CWDM transceiver coupled to the selected optical fiber trunk via the first CWDM transceiver;
a third CWDM transceiver coupled to the selected optical fiber trunk via the second CWDM transceiver;
a first optical filter coupled to the first CWDM transceiver via a first local optical fiber link, the first optical filter configured to pass the first downlink optical communications signal based on the first wavelength;
a second optical filter coupled to the second CWDM transceiver via a second local optical fiber link, the second optical filter configured to pass the second downlink optical communications signal based on the second wavelength;
a third optical filter coupled to the third CWDM transceiver via a third local optical fiber link, the third optical filter configured to pass the third downlink optical communications signal based on the third wavelength;
a fourth optical filter coupled to the third CWDM transceiver via a fourth local optical fiber link, the fourth optical filter configured to pass the fourth downlink optical communications signal based on the fourth wavelength;
a first remote unit, a second remote unit, a third remote unit, and a fourth remote unit coupled to the first optical filter, the second optical filter, the third optical filter, and the fourth optical filter to receive the first downlink optical communications signal, the second downlink optical communications signal, the third downlink optical communications signal, and the fourth downlink optical communications signal, respectively.

6. The WDS of claim 5, wherein:
the first CWDM transceiver is configured to:
receive the WDM downlink communications signal comprising the first downlink optical communications signal, the second downlink optical communications signal, the third downlink optical communications signal, and the fourth downlink optical communications signal;
wavelength de-multiplex the first downlink optical communications signal from the WDM downlink communications signal;
provide the first downlink optical communications signal to the first optical filter; and
provide a second WDM downlink communications signal comprising the second downlink optical communications signal, the third downlink optical communications signal, and the fourth downlink optical communications signal to the second CWDM transceiver; and
the first remote unit is configured to convert the first downlink optical communications signal into a first downlink RF communications signal for distribution to one or more first client devices.

7. The WDS of claim 6, wherein:
the second CWDM transceiver is configured to:
receive the second WDM downlink communications signal comprising the second downlink optical communications signal, the third downlink optical communications signal, and the fourth downlink optical communications signal;
wavelength de-multiplex the second downlink optical communications signal from the second WDM downlink communications signal;
provide the second downlink optical communications signal to the second optical filter; and
provide a third WDM downlink communications signal comprising the third downlink optical communications signal and the fourth downlink optical communications signal to the third CWDM transceiver; and
the second remote unit is configured to convert the second downlink optical communications signal into a second downlink RF communications signal for distribution to one or more second client devices.

8. The WDS of claim 7, wherein:
the third CWDM transceiver is configured to:
receive the third WDM downlink communications signal comprising the third downlink optical communications signal and the fourth downlink optical communications signal;
wavelength de-multiplex the third downlink optical communications signal and the fourth downlink optical communications signal from the third WDM downlink communications signal;
provide the third downlink optical communications signal to the third optical filter; and
provide the fourth downlink optical communications signal to the fourth optical filter;
the third remote unit is configured to convert the third downlink optical communications signal into a third downlink RF communications signal for distribution to one or more third client devices; and
the fourth remote unit is configured to convert the fourth downlink optical communications signal into a fourth downlink RF communications signal for distribution to one or more fourth client devices.

9. The WDS of claim 5, wherein:
the third remote unit is configured to:
  convert a third uplink RF communications signal received from one or more third client devices into a third uplink optical communications signal; and
  provide the third uplink optical communications signal to the third optical filter;
the fourth remote unit is configured to:
  convert a fourth uplink RF communications signal received from one or more fourth client devices into a fourth uplink optical communications signal; and
  provide the fourth uplink optical communications signal to the fourth optical filter; and
the third CWDM transceiver is further configured to:
  receive the third uplink optical communications signal from the third optical filter;
  receive the fourth uplink optical communications signal from the fourth optical filter;
  wavelength multiplex the third uplink optical communications signal with the fourth uplink optical communications signal into a third WDM uplink communications signal; and
  provide the third WDM uplink communications signal to the second CWDM transceiver.

10. The WDS of claim 9, wherein:
the second remote unit is configured to:
  convert a second uplink RF communications signal received from one or more second client devices into a second uplink optical communications signal; and
  provide the second uplink optical communications signal to the second optical filter; and
the second CWDM transceiver is configured to:
  receive the second uplink optical communications signal from the second optical filter;
  receive the third WDM uplink communications signal comprising the third uplink optical communications signal and the fourth uplink optical communications signal from the third CWDM transceiver;
  wavelength multiplex the second uplink optical communications signal with the third WDM uplink communications signal into a second WDM uplink communications signal comprising the second uplink optical communications signal, the third uplink optical communications signal, and the fourth uplink optical communications signal; and
  provide the second WDM uplink communications signal to the first CWDM transceiver.

11. The WDS of claim 10, wherein:
the first remote unit is configured to
  convert a first uplink RF communications signal received from one or more first client devices into a first uplink optical communications signal; and
  provide the first uplink optical communications signal to the first optical filter; and
the first CWDM transceiver is configured to:
  receive the first uplink optical communications signal from the first optical filter;
  receive the second WDM uplink communications signal comprising the second uplink optical communications signal, the third uplink optical communications signal, and the fourth uplink optical communications signal from the second CWDM transceiver;
  wavelength multiplex the first uplink optical communications signal with the second WDM uplink communications signal into the WDM uplink communications signal comprising the first uplink optical communications signal, the second uplink optical communications signal, the third uplink optical communications signal, and the fourth uplink optical communications signal; and
  provide the WDM uplink communications signal to the selected QSFP CWDM transceiver in the central unit via the selected optical fiber trunk among the one or more optical fiber trunks.

12. The WDS of claim 1, wherein the central unit further comprises:
one or more radio interface modules (RIMs) configured to receive a plurality of downlink communications signals; and
one or more optical interface modules (OIMs) configured to:
  receive the plurality of downlink communications signals from the one or more RIMs;
  convert the plurality of downlink communications signals into the plurality of downlink optical communications signals; and
  provide the plurality of downlink optical communications signals to the selected QSFP CWDM transceiver among the one or more QSFP CWDM transceivers;
  receive the plurality of uplink optical communications signals from the selected QSFP CWDM transceiver;
  convert the plurality of uplink optical communications signals into a plurality of uplink communications signals; and
  provide the plurality of uplink communications signals to the one or more RIMs.

13. A method for supporting an optical star communications architecture based on quad small form-factor pluggable (QSFP) coarse wavelength division multiplexing (CWDM) in a wireless distribution system (WDS), comprising:
receiving and wavelength multiplexing a plurality of downlink optical communications signals to generate a WDM downlink communications signal by a selected QSFP CWDM transceiver among one or more QSFP CWDM transceivers;
providing the WDM downlink communications signal from the selected QSFP CWDM transceiver to a selected remote unit branch among one or more remote unit branches via a selected optical fiber trunk among one or more optical fiber trunks;
receiving a WDM uplink communications signal by the selected QSFP CWDM transceiver from the selected remote unit branch via the selected optical fiber trunk; and
wavelength de-multiplexing the WDM uplink communications signal into a plurality of uplink optical communications signals.

14. The method of claim 13, further comprising:
receiving the plurality of downlink optical communications signals by a plurality of remote units in the selected remote unit branch; and
converting the plurality of downlink optical communications signals into a plurality of downlink radio frequency (RF) communications signals for distribution to client devices.

15. The method of claim 14, further comprising:
receiving a plurality of uplink RF communications signals by the plurality of remote units from the client devices;
converting the plurality of uplink RF communications signals into the plurality of uplink optical communications signals;

wavelength multiplexing the plurality of uplink optical communications signals into the WDM uplink communications signal; and providing the WDM uplink communications signal to the selected QSFP CWDM transceiver in a central unit via the selected optical fiber trunk.

16. The method of claim 13, further comprising:

receiving and wavelength multiplexing a first downlink optical communications signal, a second downlink optical communications signal, a third downlink optical communications signal, and a fourth downlink optical communications signal based on a first wavelength, a second wavelength, a third wavelength, and a fourth wavelength, respectively, to generate the WDM downlink communications signal; and providing the WDM downlink communications signal to the selected remote unit branch via the selected optical fiber trunk.

17. The method of claim 16, further comprising:

receiving the WDM downlink communications signal comprising the first downlink optical communications signal, the second downlink optical communications signal, the third downlink optical communications signal, and the fourth downlink optical communications signal;

wavelength de-multiplexing the first downlink optical communications signal from the WDM downlink communications signal;

generating a second WDM downlink communications signal comprising the second downlink optical communications signal, the third downlink optical communications signal, and the fourth downlink optical communications signal; and converting the first downlink optical communications signal into a first downlink RF communications signal for distribution to one or more first client devices.

18. The method of claim 17, further comprising:

receiving the second WDM downlink communications signal comprising the second downlink optical communications signal, the third downlink optical communications signal, and the fourth downlink optical communications signal;

wavelength de-multiplexing the second downlink optical communications signal from the second WDM downlink communications signal;

generating a third WDM downlink communications signal comprising the third downlink optical communications signal and the fourth downlink optical communications signal; and converting the second downlink optical communications signal into a second downlink RF communications signal for distribution to one or more second client devices.

19. The method of claim 18, further comprising:

receiving the third WDM downlink communications signal comprising the third downlink optical communications signal and the fourth downlink optical communications signal;

wavelength de-multiplexing the third downlink optical communications signal and the fourth downlink optical communications signal from the third WDM downlink communications signal;

converting the third downlink optical communications signal into a third downlink RF communications signal for distribution to one or more third client devices; and converting the fourth downlink optical communications signal into a fourth downlink RF communications signal for distribution to one or more fourth client devices.

20. The method of claim 13, further comprising:

converting a third uplink RF communications signal received from one or more third client devices into a third uplink optical communications signal;

converting a fourth uplink RF communications signal received from one or more fourth client devices into a fourth uplink optical communications signal; and wavelength multiplexing the third uplink optical communications signal and the fourth uplink optical communications signal into a third WDM uplink communications signal.

21. The method of claim 20, further comprising:

converting a second uplink RF communications signal received from one or more second client devices into a second uplink optical communications signal; and wavelength multiplexing the second uplink optical communications signal and the third WDM uplink communications signal into a second WDM uplink communications signal comprising the second uplink optical communications signal, the third uplink optical communications signal, and the fourth uplink optical communications signal.

22. The method of claim 21, further comprising:

converting a first uplink RF communications signal received from one or more first client devices into a first uplink optical communications signal;

wavelength multiplexing the first uplink optical communications signal with the second WDM uplink communications signal into the WDM uplink communications signal comprising the first uplink optical communications signal, the second uplink optical communications signal, the third uplink optical communications signal, and the fourth uplink optical communications signal; and providing the WDM uplink communications signal to the selected QSFP CWDM transceiver in a central unit via the selected optical fiber trunk among the one or more optical fiber trunks.

* * * * *